United States Patent [19]

Sterzel et al.

[11] Patent Number: 5,198,489

[45] Date of Patent: Mar. 30, 1993

[54] THERMOPLASTIC COMPOSITIONS FOR PRODUCING METALLIC MOLDINGS

[75] Inventors: Hans-Josef Sterzel, Dannstadt-Schauernheim; Johan H. H. ter Maat, Mannheim, both of Fed. Rep. of Germany

[73] Assignee: BASF Aktiengesellschaft, Ludwigshafen, Fed. Rep. of Germany

[21] Appl. No.: 662,431

[22] Filed: Feb. 28, 1991

[30] Foreign Application Priority Data

Mar. 8, 1990 [DE]  Fed. Rep. of Germany ....... 4007345

[51] Int. Cl.$^5$ .............................................. C08K 3/08
[52] U.S. Cl. ..................... 524/439; 514/440; 514/441; 264/63
[58] Field of Search .............. 524/439, 440, 441; 264/63

[56] References Cited

U.S. PATENT DOCUMENTS

| 4,526,921 | 7/1985 | Sakurai et al. ................ 524/405 |
| 4,624,812 | 11/1986 | Farrow et al. .................. 264/63 |
| 4,671,912 | 6/1987 | Komatsu et al. ................ 264/63 |
| 4,708,838 | 11/1987 | Bandyopadhyay et al. ...... 264/63 |

FOREIGN PATENT DOCUMENTS

| 0114746 | 8/1984 | European Pat. Off. ............. 264/63 |
| 0115104 | 8/1984 | European Pat. Off. ............. 264/63 |
| 0125912 | 11/1984 | European Pat. Off. ............. 264/63 |
| 0206685 | 12/1985 | European Pat. Off. ........... 264/233 |
| 3926869 | 2/1991 | Fed. Rep. of Germany . |
| 4000278 | 7/1991 | Fed. Rep. of Germany . |

OTHER PUBLICATIONS

Patent Abstracts of Japan, JP-A-62 012-674, Jan. 21, 1987.
Patent Abstracts of Japan, JP-A-62 278-160, Dec. 3, 1987.
U.S. Ser. No. 07/596,543.
U.S. Ser. No. 07/561,522.

*Primary Examiner*—Paul R. Michl
*Assistant Examiner*—Edward J. Cain
*Attorney, Agent, or Firm*—Oblon, Spivak, McClelland, Maier & Neustadt

[57] ABSTRACT

Thermoplastic compositions useful for producing metallic moldings contain
A) 40-65% by volume of a sinterable pulverulent metal or of a pulverulent metal alloy or of a mixture thereof,
B) 35-60% by volume of a mixture of
  B1) 85-100% by weight of a polyoxymethylene homopolymer or copolymer and
  B2) 0-15% by weight of a polymer homogeneously dissolved in B1) or dispersed therein with an average particle size of less than 1 μm,
C) 0-5% by volume of a dispersant.

16 Claims, No Drawings

THERMOPLASTIC COMPOSITIONS FOR PRODUCING METALLIC MOLDINGS

The present invention relates to thermoplastic compositions for producing metallic moldings, containing A) 40–65% by volume of a sinterable pulverulent metal or of a pulverulent metal alloy or of a mixture thereof, B) 35–60% by volume of a mixture of B1) 85–100% by weight of a polyoxymethylene homopolymer or copolymer and B2) 0–15% by weight of a polymer homogeneously dissolved in B1) or dispersed therein with an average particle size of less than 1 $\mu$m, as binder, and C) 0–5% by volume of a dispersant.

The present invention further relates to a process for preparing such compositions. The present invention additionally relates to a method of using such thermoplastic compositions for producing metallic moldings and to the metallic moldings themselves. Finally, the present invention also relates to a process for removing the binder from a preform produced from such a thermoplastic composition.

It is known to produce inorganic moldings by mixing a ceramic or metal powder with a thermoplastic resin, molding the mixture into a green preform, removing the thermoplastic resin and then sintering this preform. According to EP-B-125 912, the preform is machined to its essentially ultimate shape before being sintered. The thermoplastic resin or binder used is for example polystyrene, polypropylene, polyethylene or an ethylene/vinyl acetate copolymer. These binders are removed from the preform by heating to 300°–550° C. for 3–8 hours, by thermal cleavage. The temperatures must be raised very carefully and slowly to these levels to avoid damaging the preform through uncontrolled decomposition of the organic substance and the attendant cracking. For this reason the heatup rate should not be more than 4° C./hour. US-A-4 671 912 recommends even lower heatup rates of 1°–2° C./hour, at least until half the binder has been removed. These long heatup periods of several days do much to make these processes economically unattractive.

To shorten the heatup times, EP-B-115 104 recommends using as the binder a mixture of an oxidized paraffin wax or an oxidized microcrystalline wax with a higher fatty acid. EP-B-114 746 describes thermoplastic compositions which contain nonmetallic powders. The process described for removing the binder does not give fully satisfactory results with compositions which contain metal powders or powders of metal alloys.

These processes, which involve the use of thermoplastics or waxes, all have the disadvantage that, to achieve pyrolytic removal of the binder, the preform must be heated to temperatures above the softening point of the binder, so that the risk of deformation is ever present. To avoid such deformation, therefore, it is proposed in U.S. Pat. No. 4 708 838 and in JP-A2-62/12674 that the preform be embedded in a ceramic powder of high thermal stability.

However, it is also known to remove the binder from the preform not by pyrolytic means but by extraction with a solvent. In JP-A2-62/278160 the solvent used is supercritical carbon dioxide at 60° C. and 200 kg/cm² and in EP-B-206 685 liquid carbon dioxide at from −30° C. to 31.1° C. However, these processes require special pressure apparatus.

German Patent Applications P 39 26 869 and P 40 00 278 describe a process for producing an inorganic sinter by injection or extrusion molding a mixture of a sinterable inorganic powder and polyoxymethylene (as described for example in EP-A-114 746) as binder into a preform, removing the binder, and sintering, wherein the polyoxymethylene is removed by treating the preform in a gaseous acid-containing atmosphere. The acids used in this process are protic acids, i.e. acids which on reaction with water are split into a proton (hydrated) and an anion, or BF$_3$ or etherates thereof.

However, if pure polyoxymethylene having a low comonomer content is used as binder in the processes of the aforementioned earlier German patent applications in the production of moldings having relatively thick walls, a problem arises due to the high rate of crystallization of the polyoxymethylene. The melt solidifies at the wall of the normally cooled injection mold more rapidly than in the interior; that is, the inside of the molding crystallizes later than the outside. As the process of crystallization is accompanied by a process of volume shrinkage, cracks appear on the inside of the molding, since the already rigidified outer parts can no longer partake in the shrinkage process.

Above-cited EP-A-114 746 proposes the use of a polyoxymethylene copolymer having preferably a comonomer content of from 20 to 80 mol %. Such copolymers have a lower melting point, a lower crystallinity and increased softness and flexibility compared with the corresponding polyoxymethylene homopolymers.

However, another consequence is significantly extended cooling times and increased sticking of the molding in the mold. Owing to the lower melting points of the copolymers, the removal of binder (debindering) must also be carried out at lower temperatures, so that the debindering time required lengthens.

It is an object of the present invention to provide a thermoplastic composition for the production of metallic moldings which does not have the above-described disadvantages and from which crack-free and nonporous metallic moldings can be produced in an economical manner.

Component A) of the thermoplastic compositions according to the present invention comprises from 40 to 65, preferably from 45 to 60%, by volume of a pulverulent metal or metal alloy or a mixture thereof.

Examples of metals which can be present in powder form are iron, cobalt, nickel and silicon, to mention just a few. Examples of alloys are light metal alloys based on aluminum and titanium and alloys with copper or bronze. Finally, it is also possible to use hard metals such as tungsten carbide, boron carbide or titanium nitride in combination with metals such as cobalt and nickel. The latter can be used in the manufacture of cermet cutting tool tips.

A proportion of component A), preferably not more than 50% by weight, in particular from 5 to 20% by weight, based on component A), may be replaced by inorganic fibers or whiskers, for example of Al$_2$O$_3$, SiC or Si$_3$N$_4$.

Component B) of the thermoplastic compositions according to the present invention comprises from 35 to 60, preferably from 40 to 55%, by volume of a mixture of B1) from 85 to 100, preferably from 80 to 98%, by weight, based on B), of a polyoxymethylene homopolymer or copolymer and B2) from 0 to 15, preferably from 5 to 10%, by weight of a polymer homogeneously dissolved in B1) or dispersed therein with an average particle size of less than 1 μm, preferably from 0.01 to 0.9, in particular from 0.1 to 0.8 μm, as binder.

Polyoxymethylene homopolymers and copolymers are known per se to the skilled worker and are described in the literature.

The homopolymers are in general prepared by polymerizing formaldehyde or trioxane, preferably in the presence of suitable catalysts.

Polyoxymethylene copolymers which are preferred for the purposes of the present invention, besides the repeat unit —OCH$_2$—, contain up to 50, preferably 0.1-20, in particular 0.3-10, mol % of repeat units

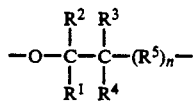

where each of $R^1$ to $R^4$ is independently of the others hydrogen, $C_1$-$C_4$-alkyl or haloalkyl of 1-4 carbon atoms, $R^5$ is —CH$_2$—, —CH$_2$O—, $C_1$-$C_4$-alkyl- or $C_1$-$C_4$-haloalkyl-substituted methylene or similar oxmethylene, and n is 0-3. Advantageously, these groups can be introduced into the copolymers by ring opening of cyclic ethers. Preferred cyclic ethers are those of the formula

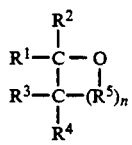

where $R^1$-$R^5$ and n are each as defined above. Examples of cyclic ethers are ethylene oxide, 1,2-propylene oxide, 1,2-butylene oxide, 1,3-butylene oxide, 1,3-dioxane, 1,3-dioxolane and dioxepane, and examples of comonomers are linear oligo- or polyformals such as polydioxolane and polydioxepane.

Suitable components B1) also include oxymethylene terpolymers prepared for example by reacting trioxane, one of the above-described cyclic ethers and a third monomer, preferably a bifunctional compound of the formula

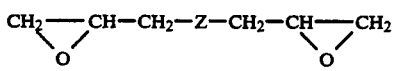

where Z is a chemical bond, —O— or —ORO— (R=$C_1$-$C_8$-alkylene or $C_3$-$C_8$-cycloalkylene).

Preferred monomers of this kind are ethylene diglycide, diglycidyl ethers and diethers of glycidyls and formaldehyde, dioxane or trioxane in a molar ratio of 2:1 and also diethers of 2 mol of glycidyl compound and 1 mol of an aliphatic diol of 2-8 carbon atoms, for example the diglycidyl ethers of ethylene glycol, 1,4-butanediol, 1,3-butanediol, 1,3-cyclobutanediol, 1,2-propanediol and 1,4-cyclohexanediol, to name but a few.

Processes for preparing the above-described homopolymers and copolymers are known to the person skilled in the art and are described in the literature, so that no further details are required.

The preferred polyoxymethylene homopolymers and copolymers have melting points of at least 150° C. and weight average molecular weights within the range from 5 to 150,, preferably from 7 to 60,.

A suitable component B2) is basically any polymer which is homogeneously soluble in the polyoxymethylene homopolymer or copolymer B1) or dispersible therein with the required particle size.

Preferred polymers of this kind are aliphatic polyurethanes, aliphatic uncrosslinked polyepoxides, poly(C$_2$-C$_6$-alkylene oxide)s, aliphatic polyamides and polyacrylates and mixtures thereof.

Suitable aliphatic polyurethanes are prepared in a conventional manner by polyaddition of aliphatic polyisocyanates, in particular aliphatic diisocyanates, and aliphatic polyhydroxy compounds such as polyesters, polyethers, polyesteramides or polyacetals or mixtures thereof, in the presence ®or absence of chain extenders.

Suitable aliphatic polyisocyanates are in particular aliphatic diisocyanates of the formula

OCN—$R^6$—NCO where $R^6$ is a saturated straight-chain or branched aliphatic radical of from 1 to 20, preferably from 2 to 12, carbon atoms or an unsubstituted or substituted saturated cycloaliphatic divalent radical of from 4 to 20, preferably from 6 to 15, carbon atoms.

In the above formula $R^6$ may also represent a combination of divalent open-chain aliphatic and cycloaliphatic radicals and have for example the meaning of

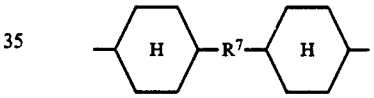

where $R^7$ is a saturated straight-chain or branched aliphatic radical of from 1 to 8, preferably from 1 to 3, carbon atoms. In this formula, the two rings preferably each represent unsubstituted cyclohexane, while $R^7$ is preferably methylene, ethylene, methylmethylene or dimethylmethylene.

If $R^6$ is an open-chain divalent radical, it is preferably an unbranched alkylene radical —(CH$_2$)$_n$— where n is from 2 to 12. Examples thereof are ethylene, propylene, pentamethylene, hexamethylene, 2-methylpentamethylene, 2,2,4-trimethylhexamethylene and 2,4,4-trimethylhexamethylene. Diisocyanates of this type, which are particularly preferred, are hexamethylene diisocyanate and the 2,2,4- and 2,4,4-trimethylhexamethylene diisocyanates.

If in the above formula $R^6$ is a cycloaliphatic radical, it is preferably an unsubstituted or substituted cyclohexane radical. Examples of diisocyanates of this type are 1,2- or 1,4-di(isocyanatomethyl)cyclohexane and isophorone diisocyanate.

The diisocyanates may also be used in an oligomeric form, for example in a dimeric or trimeric form. Instead of polyisocyanates it is also possible to use conventionally blocked polyisocyanates obtained from the cited isocyanates, for example by addition of phenol or caprolactam.

Suitable aliphatic polyhydroxy compounds are polyethers, such as polyethylene glycol ethers, polypropylene glycol ethers and polybutylene glycol ethers, poly-1,4-butanediol ether and copolyethers of ethylene oxide and propylene oxide. It is also possible, to use for this purpose polyesteramides, polyacetals and preferably aliphatic polyesters, in which case all these compounds have free OH end groups.

The preferred aliphatic polyesters are essentially uncrosslinked polyesters having molecular weights of from 500 to 10,000 preferably from 500 to 5,000. As regards the acid component they are derived from unbranched and/or branched aliphatic dicarboxylic acids, for example dicarboxylic acids of the formula

HOOC—(CH$_2$)$_n$—COOH where n is from 0 to 20, preferably from 4 to 10, in particular adipic acid and sebacic acid. It is also possible to use cycloaliphatic dicarboxylic acids, such as cyclohexanedicarboxylic acid, and mixtures with the above aliphatic dicarboxylic acids.

The alcohol components of these polyesters are in particular unbranched or branched aliphatic primary diols, for example diols of the formula

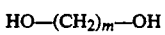

HO—(CH$_2$)$_m$—OH where m is from 2 to 12, preferably from 2 to 6. Specific examples are ethylene glycol, 1,4-butanediol, 1,6-hexanediol, 2,2-dimethyl-1,3-propanediol and also diethylene glycol. It is also possible to use cycloaliphatic diols, such as bishydroxymethylcyclohexanes, or mixtures with aliphatic diols.

The polyesters may be prepared from one dicarboxylic acid and one diol at a time or else, as mentioned, from mixtures of a plurality of dicarboxylic acids and/or a plurality of diols.

Suitable chain extenders for the preparation of polyurethanes are in particular low molecular weight polyols, in particular diols, and also polyamines, in particular diamines, but also water.

The polyurethanes are preferably thermoplastic and hence preferably essentially uncrosslinked, i.e. repeatedly fusible without noticeable signs of decomposition. Their reduced specific viscosities, measured at 30° C. in dimethylformamide, are in general within the range from 0.5 to 3 dl/g, preferably from 1 to 2 dl/g.

Suitable aliphatic uncrosslinked polyepoxides are polymers of glycidyl (meth)acrylate or epichlorohydrin with suitable comonomers, to mention but a few. Preference is given to copolymers of epichlorohydrin and 2,2-bis(4-hydroxyphenyl)propane (bisphenol A), which are commercially available under the trade names Epikote TM and Phenoxy TM.

Suitable poly(C$_2$–C$_6$-alkylene oxide)s are in particular polyethylene oxide, polypropylene oxide and polytetrahydrofuran (poly(tetramethylene) oxide) having number average molecular weights within the range from 2,000 to 20,000 preferably from 5,000 to 10,000. Appropriate products are commercially available and methods of preparation known to the person skilled in the art, obviating the need for further details.

Suitable aliphatic polyamides are in particular amorphous polyamides and polyamides of low crystallinity.

A preferred group of such polyamides contain units derived from diamines of the formula

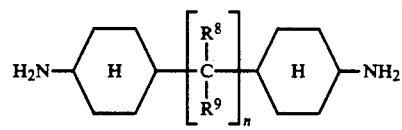

where $R^8$ and $R^9$ are each independently of the other hydrogen, methyl or ethyl, n is from 0 to 6, and the cyclohexyl rings may be alkyl-substituted, and aliphatic dicarboxylic acids such as adipic acid, azelaic acid, sebacic acid and dodecanedioic acid.

Diamines of this structure are in general referred to as dicyandiamines; preferred diamines of this type are 4,4'-diaminodicyclohexylmethane

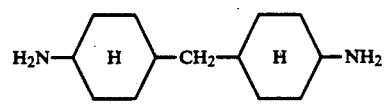

and the derivatives thereof which are methyl-substituted in the cyclohexyl rings.

As well as the foregoing units, preferred polyamides preferably contain further units derived from lactams or salts of further aliphatic diamines and aliphatic dicarboxylic acids.

Preferred lactams are ε-caprolactam and oenantholactam, preferred salts are those of adipic acid and hexamethylenediamine. The molar ratio of different units is not subject to any particular constraints and therefore can vary within wide limits.

Preference is given to polyamides containing units derived from ε-caprolactam, adipic acid/hexamethylenediamine and adipic acid/4,4'-diaminodicyclohexylmethane.

A further preferred group of amorphous polyamides contain units derived from alkyl-substituted hexamethylenediamines and the aforementioned aliphatic dicarboxylic acids, although units of the above-described type may again be present.

Polyamides of this type are prepared by polycondensation of the monomer ingredients in appropriate ratios; appropriate condensation processes are known to the person skilled in the art.

The last group of polymers B2) which may be mentioned are polyacrylates, for example as described in DE 38 05 052.

They are formed in the proportion of 40–100% by weight of methyl acrylate or ethyl acrylate or mixtures thereof and in the proportion of 0–60% by weight of units derived from monomers of the formula

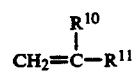

where $R^{10}$ is hydrogen or methyl and $R^{11}$ is phenyl or a radical of the formula

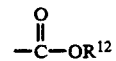

where $R^{12}$ is alkyl of 1–14 carbon atoms and $R^{12}$ is not —CH$_3$ or —C$_2$H$_5$ if $R^{10}$ is hydrogen.

Such polyacrylates are compatible with polyoxymethylene homopolymers and copolymers, as evidenced by the fact that the mixture has only one glass transition temperature (Tg) or that the Tg values of the individual components are shifted. Such polymers formed from monomers of the formula I with or without further monomers, preferably of the formula II, can be prepared in a conventional, preferably a free-radical, polymerization, for example an emulsion or bead, solution or bulk polymerization (cf. Kirk-Othmer, Encyclopedia of Chemical Technology 3rd Ed., Vol. 1., pp. 330–342, Vol. 18, pp. 720–755, J. Wiley; H. Rauch-Puntigam, Th. Völker, Acryl- und Methacrylverbindungen). Possible initiators, depending on the monomers and the type of polymerization, are free radical initiators such as peroxo compounds and azo compounds, the amount of initiator being in general within the range from 0.001 to 0.5% by weight, based on the monomers.

Suitable initiators for an emulsion polymerization are for example peroxodisulfates and possibly redox systems, for a bulk polymerization not only peroxides such as dibenzoyl peroxide or dilauroyl peroxide but also azo compounds, for example azobisisobutyrodinitrile, similarly in the case of a solution or bead polymerization. The molecular weight may be regulated using conventional regulators, in particular mercaptans, e.g. dodecylmercaptan.

preferably, the polymerization is carried out at elevated temperature, for example above 50° C. The molecular weight is in general within the range from 2,000 to 5,000,000, preferably from 20,000 to 3,000,000 (determination by light scattering; cf. Houben-Weyl, Methoden der Org. Chemie, 4th edition, Volume 14/1, Georg Thieme-Verlag Stuttgart 1961).

Component C) of the thermoplastic compositions according to the present invention may comprise from 0 to 5, preferably from 1 to 5%, by volume of a dispersant. Examples are oligomeric polyethylene oxide having an average molecular weight of 200–600, stearic acid, hydroxystearic acid, fatty alcohols, fatty alcohol sulfonates and block copolymers of ethylene oxide and propylene oxide.

Additionally, the thermoplastic compositions may contain customary additives and processing aids which have a favorable influence on the rheological properties of the mixtures at the molding stage.

The thermoplastic compositions according to the present invention are prepared in the process according to the present invention by melting component B), preferably in a twin-screw extruder, at preferably 150°–220° C., in particular 170°–200° C. Component A) is then metered in the required amount into the melt stream of component B) at temperatures within the same range. Advantageously, component A) contains the dispersant(s) C) at the surface.

A particularly preferred apparatus for metering in component A) contains as an essential element a conveyor screw which is situated within a heatable metal cylinder and which conveys component A) into the melt of component B).

The above-described process has the advantage over mixing the components at room temperature and then extruding them at elevated temperature that any decomposition of the polyoxymethylene binder as a consequence of the high shear forces arising in this version of the process is substantially avoided.

If molding is to take the form of injection molding, the customary screw and piston injection machines can be used. This generally takes place at 175°–200 C. and 3000–20,000 kPa into molds maintained at 60°–120° C.

Extrusion molding into pipes, rods and profiles preferably takes place at 170°–200° C.

To remove the binder, the preforms are preferably first treated with a gaseous acid-containing atmosphere in line with the earlier German Patent Applications P 39 29 869 and P 40 00 278.

This treatment takes place in the process according to the present invention at 20°–180° C. in the course of 0.1–24 h, preferably 0.5–12 h.

Suitable acids for the treatment in this first stage of the process according to the present invention are inorganic acids which are already gaseous at room temperature or at least vaporizable at the treatment temperature. Examples are halohydric acids and $HNO_3$. Suitable organic acids are those which have a boiling point of less than 130° C. under atmospheric pressure, for example formic acid, acetic acid, trifluoroacetic acid or mixtures thereof.

Other suitable acids are $BF_3$ and adducts thereof with organic ethers. In general, the required treatment time depends on the treatment temperature and the concentration of the acid in the treatment atmosphere.

If a carrier gas is used, it is generally passed beforehand through the acid to become laden therewith. The so laden carrier gas is then brought to the treatment temperature, which advantageously is higher than the lading temperature to avoid condensation of the acid.

Preferably, the acid is mixed into the carrier gas via a metering means and the mixture is heated up to such an extent that it is no longer possible for the acid to condense.

The treatment in the first stage is carried on until the polyoxymethylene content B1) of the binder has been removed to a degree of at least 80%, preferably at least 90% by weight. This is easily discernible from the decrease in weight. The products so obtained are then heated to 250°–500° C., preferably 350°–450° C., for 0.1–12 h, preferably 0.3–6 h, in order to remove in full any residue of binder still present.

The product so freed of binder can then be converted into a metallic molding in a conventional manner by sintering.

The thermoplastic compositions according to the present invention have the advantage that the preforms or metallic moldings produced therefrom are free of cracks and pores even when they have thick walls.

EXAMPLE 1

A twin-screw extruder having a screw diameter of 30 mm was charged with 5.6 kg/h of a polyoxymethylene containing 2.5% by weight of butanediol formal as comonomer. The material was melted at 180° C., and the screw speed was 70 rpm.

An extruder flanged laterally to the first extruder and equipped with a conveyor spiral for powder was charged with 39.5 kg/h of an iron powder containing 1% by weight of a polyethylene oxide of molecular weight 400 as dispersant, and the contents were heated to 170° C. by the end of the conveyor screw.

At the end of the conveying section the metal powder was mixed with the polyoxymethylene stream, and the mixture was sheared, homogenized and extruded through dies in strand form. The strands were cooled in an air stream and granulated. The granules thus obtained contained about 55% by volume of iron powder.

The granules were melted in the cylinder of a screw type injection molding machine at 180° C. and injected into a mold having a wall leading temperature of 110° C. to produce disks 80 mm in diameter and 4 mm in thickness.

The subsequent debindering was carried out in a virtually tight drying cabinet 50 l in capacity. The atmosphere was vigorously recirculated within the drying cabinet using a ventilator in order to achieve a constant temperature within the entire cabinet and efficient heat transfer to the structure to be debindered.

The drying cabinet was equipped with one of the injection molded disks; to be precise the disk was suspended from a wire passing upward through the housing and connected to a balance to permit continuous measurement of the weight loss. Then the cabinet was purged for 20 minutes with a nitrogen stream of 400 l/h in order to displace the air down to an $O_2$ content of less than 1–2%. At the same time, the atmosphere in the drying cabinet was heated to 150° C. The debindering was started with the addition of 35 g/h of 68% strength by weight nitric acid to the 400 l/h nitrogen stream, so that the concentration of the nitric acid in the metered gas stream was about 2% by volume.

Given that the starting weight of the disk was 100.0 g, 12.7% by weight of binder corresponded to 12.7 g. The following table shows the weight decrease as a function of time:

| Time (min) | Weight decrease (g) | Degree of debindering (%) |
| --- | --- | --- |
| 0 | 0 | 0 |
| 10 | 3.56 | 28.0 |
| 20 | 5.94 | 46.8 |
| 30 | 7.26 | 57.2 |
| 40 | 8.76 | 69.0 |
| 50 | 10.17 | 80.1 |
| 60 | 11.75 | 92.5 |
| 70 | 12.32 | 97.0 |

EXAMPLE 2

A twin-screw extruder having a screw diameter of 30 mm was charged with 5.5 kg/h of a mixture of 87% by weight of a polyoxymethylene containing 2.5% by weight of butanediol formal as comonomer and 13% by weight of polymethyl acrylate of average molecular weight 100,000. The material was melted at 180° C., and the screw speed was 70 rpm.

An extruder flanged laterally to the first extruder and equipped with a conveyor spiral for powder was charged with 11.4 kg/h of silicon powder having an average particle diameter of 5 μm and containing 1.0% by weight of polyethylene oxide of molecular weight 400 as dispersant, and the contents were heated to 170° C. by the end of the conveyor screw.

At the end of the conveying section the silicon powder was mixed with the polyoxymethylene melt stream, and the mixture was sheared, homogenized and extruded through dies in strand form. The strands were cooled down in an air stream and granulated. The granules thus obtained contained 54% by volume of silicon powder.

The granules were melted in the cylinder of a screw type injection molding machine at 180° C. and injected into a mold having a wall temperature of 110° C. to produce disks 80 mm in diameter and 4 mm in thickness.

The subsequent debindering was carried out in a virtually tight drying cabinet 50 l in capacity. The atmosphere within the drying cabinet was vigorously recirculated by means of a ventilator in order to achieve a constant temperature within the entire cabinet and efficient heat transfer to the structure to be debindered.

The drying cabinet was equipped with one of the injection molded disks; to be precise the disk was suspended from a wire leading upward through the housing and connected to a balance in order to permit continuous measurement of the weight loss. The cabinet was then purged with a nitrogen stream of 400 l/h for 20 minutes in order to displace the air down to an $O_2$ content of less than 1–2%. At the same time, the atmosphere in the drying cabinet was heated to 150° C. The debindering was started with the addition of 10 l/h of $BF_3$ to the 400 l/h nitrogen stream, so that the concentration of $BF_3$ in the metered gas stream was 2.5% by volume.

Given a starting weight of the disk of 38.1 g, the 32.5% by weight of binder corresponded to 12.4 g. The following table shows the weight decrease as a function of time:

| Time (min) | Weight decrease (g) | Degree of debindering (%) |
| --- | --- | --- |
| 0 | 0 | 0 |
| 5 | 3.56 | 28.0 |
| 10 | 5.94 | 46.8 |
| 15 | 7.26 | 57.2 |
| 20 | 8.76 | 69.0 |
| 25 | 10.17 | 80.1 |
| 30 | 11.75 | 92.5 |
| 35 | 12.02 | 97.0 |

Thereafter the disk was maintained at 400° C. for 1 h. In the course of this period the weight decreased by a further 0.38 g, corresponding to a degree of debindering of 100%. The disk was free of dimensional changes and cracks.

We claim:

1. A thermoplastic composition for producing a metallic molding, containing
   A) 40–65% by volume of a sinterable pulverulent metal or of a pulverulent metal alloy or of a mixture thereof,
   B) 35–60% by volume of a mixture of
      B1) 85–95% by weight of a polyoxymethylene homopolymer or copolymer and
      B2) 4–15% by weight of a polymer homogeneously dissolved in B1) or dispersed therein with an average particle size of less than 1 μm, as binder, and
   C) 0–5% by volume of a dispersant,
      wherein component B2) is an aliphatic uncrosslinked polyepoxide, an aliphatic polyamide or polyacrylate or a mixture thereof.

2. A metallic molding produced from a thermoplastic composition as claimed in claim 1.

3. A thermoplastic composition according to claim 1, wherein component B2) is an aliphatic uncrosslinked polyepoxide.

4. A thermoplastic composition according to claim 1, wherein component B2) is an aliphatic polyamide.

5. A thermoplastic composition according to claim 1, wherein component B2) is a polyacrylate.

6. A metallic molding produced from a thermoplastic composition as claimed in claim 3.

7. A metallic molding produced from a thermoplastic composition as claimed in claim 4.

8. A metallic molding produced from a thermoplastic composition as claimed in claim 5.

9. A process for preparing a thermoplastic composition containing as essential components
   A) 40–65% by volume of a sinterable pulverulent metal or of a pulverulent metal alloy or of a mixture thereof,
   B) 35–60% by volume of a mixture of
      B1) 85–95% by weight of a polyoxymethylene homopolymer or copolymer and
      B2) 5–15% by weight of a polymer homogeneously dissolved in B1) or dispersed therein with an average particle size of less than 1 μm, as binder, and
   C) 0–5% by volume of a dispersant, wherein component B2) is an aliphatic uncrosslinked polyepoxide, an aliphatic polyamide or polyacrylate or a mixture thereof which comprises
      a) melting component B) at 150°–220° C. and then
      b) metering component A) into the melt stream of component B) with or without C) at a temperature within the same range as in step a).

10. A process for removing the binder from a preform produced from a thermoplastic composition as claimed in claim 1, which comprises
   a) producing a preform from the thermoplastic composition by injection or extrusion molding,
   b) treating the resulting preform at from 20° to 180° C. with a gaseous acid-containing atmosphere for 0.1–24 h, and
   c) then heating it at 250°–500° C. for 0.1–12 h.

11. A process for preparing a thermoplastic composition according to claim 9, wherein component B2) is an aliphatic uncrosslinked polyepoxide.

12. A process for preparing a thermoplastic composition according to claim 9, wherein component B2) is an aliphatic polyamide.

13. A process for preparing a thermoplastic composition according to claim 9, component B2) is a polyacrylate.

14. A process for removing the binder from a preform produced from a thermoplastic composition as claimed in claim 3, which comprises
   a) producing a preform from the thermoplastic composition by injection or extrusion molding,
   b) treating the resulting preform at from 20° to 180° C. with a gaseous acid-containing atmosphere for 0.1–24 h, and
   c) then heating it at 250°–500° C. for 0.1–12 h.

15. A process for removing the binder from a preform produced from a thermoplastic composition as claimed in claim 4, which comprises
   a) producing a preform from the thermoplastic composition by injection or extrusion molding,
   b) treating the resulting preform at from 20° to 180° C. with a gaseous acid-containing atmosphere for 0.1–24 h, and
   c) then heating it at 250°–500° C. for 0.1–12 h.

16. A process for removing the binder from a preform produced from a thermoplastic composition as claimed in claim 5, which comprises
   a) producing a preform from the thermoplastic composition by injection or extrusion molding,
   b) treating the resulting preform at from 20° to 180° C. with a gaseous acid-containing atmosphere for 0.1–24 h, and
   c) then heating it at 250°–500° C. for 0.1–12 h.

* * * * *